US009822232B2

(12) United States Patent
Farrand et al.

(10) Patent No.: US 9,822,232 B2
(45) Date of Patent: Nov. 21, 2017

(54) BLACK POLYMER PARTICLES

(71) Applicants: Merck Patent GmbH, Darmstadt (DE);
The Queen's University of Belfast, Belfast (GB)

(72) Inventors: Louise D. Farrand, Dorset (GB);
Sarah Norman, Chilton (GB)

(73) Assignees: Merck Patent GmbH, Darmstadt (DE);
The Queen's University of Belfast, Belfast (GB)

(*) Notice: Subject to any disclaimer, the term of this patent is extended or adjusted under 35 U.S.C. 154(b) by 0 days.

(21) Appl. No.: 15/100,390

(22) PCT Filed: Nov. 18, 2014

(86) PCT No.: PCT/EP2014/003074
§ 371 (c)(1),
(2) Date: May 31, 2016

(87) PCT Pub. No.: WO2015/082048
PCT Pub. Date: Jun. 11, 2015

(65) Prior Publication Data
US 2016/0297945 A1   Oct. 13, 2016

(30) Foreign Application Priority Data
Dec. 2, 2013 (EP) .................... 13005610

(51) Int. Cl.
C08K 3/04     (2006.01)
G02F 1/167    (2006.01)
C08K 5/18     (2006.01)
C08J 3/09     (2006.01)

(52) U.S. Cl.
CPC ............ C08K 3/04 (2013.01); C08J 3/093 (2013.01); C08K 5/18 (2013.01); G02F 1/167 (2013.01); *C08J 2333/02* (2013.01); *C08J 2339/06* (2013.01); *G02F 2001/1678* (2013.01)

(58) Field of Classification Search
CPC .. C08K 3/04; C08K 5/18; G02F 1/167; G02F 2001/1678
USPC ............ 252/500, 586; 359/296; 427/212; 430/32; 977/773
See application file for complete search history.

(56) References Cited

U.S. PATENT DOCUMENTS 4,065,259 A * 12/1977 Jackson ............ C09B 67/0082
8/142
5,380,362 A    1/1995 Schubert
5,403,518 A    4/1995 Schubert
5,783,614 A    7/1998 Chen et al.
6,194,488 B1   2/2001 Chen et al.
6,956,690 B2  10/2005 Yu et al.
7,038,655 B2   5/2006 Herb et al.
7,052,766 B2   5/2006 Zang et al.
7,110,162 B2   9/2006 Wu et al.
7,170,670 B2   1/2007 Webber
7,226,550 B2   6/2007 Hou et al.
7,236,290 B1   6/2007 Zhang et al.
7,247,379 B2   7/2007 Pullen et al.
7,277,218 B2  10/2007 Hwang et al.
7,304,634 B2  12/2007 Albert et al.
9,018,299 B2   4/2015 Hosaka et al.
2007/0128352 A1   6/2007 Honeyman et al.
2007/0268244 A1  11/2007 Chopra et al.
2010/0120948 A1   5/2010 Gane et al.
2012/0194899 A1   8/2012 Zhang

FOREIGN PATENT DOCUMENTS

| EP | 1491941 A2 | 12/2004 | |
|---|---|---|---|
| GB | 2438436 A | 11/2007 | |
| GB | WO 2011/154103 A1 * | 12/2011 | |
| GB | WO 2013/026519 * | 2/2013 | |
| WO | WO-99/10767 A1 | 3/1999 | |
| WO | WO 02/087738 A1 * | 11/2002 | ........... C08J 3/09 |
| WO | WO-02087738 A1 | 11/2002 | |
| WO | WO-03058335 A2 | 7/2003 | |
| WO | WO-2005017046 A2 | 2/2005 | |
| WO | WO-2010104606 A1 | 9/2010 | |
| WO | WO-2010017446 A1 | 2/2011 | |
| WO | WO-2011075720 A1 | 6/2011 | |
| WO | WO-2011154103 A1 | 12/2011 | |
| WO | WO-2011154104 A1 | 12/2011 | |
| WO | WO-2013026519 A1 | 2/2013 | |
| WO | WO-2013065485 A1 | 5/2013 | |

OTHER PUBLICATIONS

International Search Report for PCT/EP2014/003074 dated Aug. 25, 2015.
Sunohara, S., et al., "Investigation of color electrophoretic display utilizing electrophoretic colored particles", Yth Translation, Nippon Gazo Gakkaishi, vol. 46, No. 4, (2007), pp. 247-253.
Sunohara, S., et al., "Preparation of poly-vinyl pyrrolidone fine particles by inverse emulsification-evaporation process in solvent", Yth Translation, Kobunshi Ronbunshu, vol. 62, No. 7. (2005), pp. 310-315.

* cited by examiner

Primary Examiner — Bijan Ahvazi

(57) ABSTRACT

This invention relates to a process for the preparation of a dispersion comprising black polymer particles, such black polymer particles prepared by the process, the use of the dispersion and the black polymer particles in electrophoretic fluids, and electrophoretic display devices comprising such fluids.

20 Claims, No Drawings

BLACK POLYMER PARTICLES

CROSS-REFERENCE TO RELATED APPLICATIONS

This application is a national stage application (under 35 U.S.C. §371)of PCT/EP2014/003074, filed Nov. 18, 2014, which claims benefit of European Application No. 13005610,4, filed Dec. 2, 2013, both applications of which are incorporated herein by reference in their entirety.

This invention relates to a process for the preparation of a dispersion comprising black polymer particles, such black polymer particles prepared by the process, the use of the dispersion and the black polymer particles, especially in electrophoretic fluids and electrophoretic display devices.

BACKGROUND OF THE INVENTION

EPDs (Electrophoretic Displays) and their use for electronic paper are known for a number of years. An EPD generally comprises charged electrophoretic particles dispersed between two substrates, each comprising one or more electrodes. The space between the electrodes is filled with a dispersion medium which is a different colour from the colour of the particles. The dispersion medium is usually a low refractive index solvent, such as dodecane. Fluorinated solvents may be used for example in Total Internal Reflection (TIR) type EPDs. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels. Mainly black and white particles are used. Available technologies of EPDs include electronic paper, commercially used in electronic books. This application uses black and white colour.

The use of different coloured particles in a single pixel has been exemplified in recent patent literature (U.S. Pat. No. 7,304,634, GB 2 438 436, US 2007/0268244). Two particle systems comprising inorganic and resin particles are also known (EP 1 491 941). These coloured particles are only achievable by complicated processes and/or they are only suitable for specific applications. Particles comprising a polymer and a pigment or a dye prepared by an evaporative process are described in US 2010/120948, WO 2011/154103, WO 2011/154104, WO 2013/026519, Nippon Gazo Gakkaishi 46(4) 2007, 247-253, and Kobunshi Ronbunshu, 62(7), 310-315 (July 2005).

However, there still is a need for a simple, repeatable and cheap preparation of fluids comprising black polymer particles dispersed in low refractive index media, especially in a fluorinated media, wherein the black polymer particles do not leach colour in a dispersion and preferably show electrophoretic mobility. An improved route to provide black particles and new fluids comprising such particles has now been found.

SUMMARY OF THE INVENTION

The present invention relates to a process for the preparation of black polymer particles dispersed in at least one non-polar fluorinated solvent for use in electrophoretic devices, comprising the steps of
a) forming a reverse emulsion comprising at least one polymer, at least one carbon black pigment, at least one polar solvent, at least one non-polar fluorinated solvent, and at least one surfactant, and
b) removing the polar solvent or polar solvents by evaporative methods, wherein the non-polar fluorinated solvent or solvents are not removed.

The subject matter of this invention also relates to black polymer particles and dispersions prepared by such process with an additional concentration or solvent removing step, to the use of the dispersion and the black polymer particles, and devices comprising the dispersion and the black polymer particles.

DETAILED DESCRIPTION OF THE INVENTION

Throughout the specification, "reverse emulsion" means that a non-polar, fluorinated solvent forms a continuous phase and a polar solvent forms a discontinuous phase (internal phase). Furthermore, the present process is called either "evaporative precipitation" or "reverse emulsion solvent removal" (RESR) due to the steps involved in forming a reverse emulsion and then removing the polar solvent from the internal phase by evaporative methods to form a dispersion of black polymer particles in a nonpolar fluorinated solvent as continuous phase.

The present invention provides a simple cost-effective and repeatable process to prepare black polymer particles having low polydispersity, good steric stability, photostability, and heat stability, and which do not leach colour in a dispersion medium, and dispersions comprising such particles. It is most convenient that the process of the invention can directly yield dispersions of black polymer particles in a liquid medium suitable for different display devices, primarily for EPDs. So, no solvent transfer step is required to change to the final solvent suitable for use as an electrophoretic fluid. Therefore, no unwanted solvent contamination occurs in the final formulation. This also allows transfer to other solvents suitable for EPD if so desired.

Preferably, the particles are formed directly in a low refractive index and/or specific high density solvent, fluorinated solvent which is highly suitable for an EPD fluid without having to dry particles, and then re-disperse them. In particular, the present process allows separately manipulating size, charge, mono-dispersity, steric stability, electrophoretic mobility, etc. of the particles.

The new process does not require multiple steps or require expensive drying steps followed by difficult formulation into a low dielectric solvent. Advantageously, the present process uses materials which are largely non-hazardous and commercially available and does not require any chemical changes but only physical changes. The method developed is a simple process using as few as possible physical processes to yield the desired dispersions, especially an electrophoretic fluid, in-situ by forming a reverse emulsion and evaporating the internal phase solvent to give the desired black polymer particles.

In addition, the particles may have the following properties: a homogeneous cross linked network structure for solvent resistance, a non-swelling nature when dispersed in EPD solvent media, impact strength, hardness, dispersible in a non polar continuous phase that is the most used media for EPD, high electrophoretic mobility in dielectric media, excellent switching behaviour, and faster response times at comparable voltages.

An essential component of the invention is carbon black. Examples of suitable commercially available carbon black pigments are Black Pearls E, Black Pearls L, Mogul E, Regal 400, TPK 1099R, TPK 1104R and TPK1227R from Cabot, SB350, FW200, Special Black 4, Special Black 6, XPB 229 and Nipex 150 from Orion Engineered Carbons. Preferred are carbon blacks with an acidic and hydrophilic nature.

Since the carbon black can appear hues of brown/black or even blue/black when used at low concentrations or in a thin cell, a blue or black dye may be used in combination with carbon black to correct this. Preferred dyes are Solvent Blue 35, Solvent Black 27, Solvent Black 29, Solvent Black 34, Acid Black 52, Acid Black 107, Acid Black 132, Acid Black 172, Acid Black 194, Acid Black 211, Acid Black 222, Direct Black 19, Direct Black 22, Direct Black 51, Direct Black 80, and/or Direct Black 112.

Especially preferred are: Direct Black 22, Acid Black 52, Acid Black 132, Acid Black 107, Acid Black 172, Solvent Black 27, Solvent Black 29, and Solvent Blue 35. Optionally, the dyes can be used in combination with light stabilisers, e. g. hindered amine stabilisers, such as 1,2,2,6,6-pentamethylpiperidine or 1,2,2,6,6-pentamethyl-4-piperidinol, and bis(1,2,2,6,6-pentamethyl-4-piperidinyl)-[(3,5-bis(1,1-dimethyl)-4-hydroxyphenyl]methyl] butylmalonate, or UV absorbers such as benzophenone, 2,4-dihydroxybenzophenone, and 2-(2-hydroxy-5-methylphenyl)benzotriazole.

Solvents for the two phases of the reverse emulsion are preferably chosen to be as immiscible as possible whilst being good solvents for the components. Preferably the solvents are used in a weight ratio range for continuous phase to discontinuous phase of from 5:1 to 1:1, preferably 3.5:1 to 1:1, especially 2:1 to 1:1.

The continuous phase non-polar fluorinated solvent is required to be a good solvent for the surfactants being used. The continuous phase solvent can be chosen primarily on the basis of dielectric constant, refractive index, density and viscosity. A preferred solvent choice would display a low dielectric constant (<10, more preferably <6), high volume resistivity (about $10^{15}$ ohm-cm), a low viscosity (less than 5 cst), low water solubility, a high boiling point (>80° C.), a very low refractive index (<1.32) and a density similar to that of the particles. Tweaking these variables can be useful in order to change the behaviour of the final application.

The non-polar fluorinated solvents tend to be low dielectric, and high density solvents. A density matched particle/solvent mixture will yield much improved settling or creaming characteristics and thus is desirable. For this reason, often it can be useful to add a lower density solvent to enable density matching, or a mixture of perfluorinated and partially fluorinated solvents. Adjustments of solvent variables in order to change the behaviour of the final application are known in the art.

Preferred solvents are non-polar perfluorinated hydrocarbons, e. g. perfluoro(tributylamine), perfluoro (2-n-butyl hydrofuran), 1,1,1,2,3,4,4,5,5,5,-decafluoropentane, etc. Particularly, commercial non-polar fluorinated solvents such as the Fluorinert® FC or Novec® series from 3M and the Galden® serie from Solvay Solexis can be used, e.g. FC-3283, FC-40, FC-43, FC-75 and FC-70 and Novec® 7500 and Galden® 200 and 135. In particular, perfluoro(tributylamine) can be used.

The discontinuous phase solvent is chosen primarily on the dispersibility of the carbon black and the solubility of the polymer matrix components, its boiling point relative to that of the continuous phase and its solubility in the continuous phase. A preferred discontinuous phase solvent shows a high dielectric constant $\epsilon$, preferably $\epsilon$>20, more preferably >40, especially >50. Those solvents particularly suitable are water, low molecular weight alcohols, industrial methylated spirits (IMS; typically comprising 94 vol. % ethanol, 4 vol. % methanol, 2 vol. % water), and some of the more hydrophilic solvents from ketones, aldehydes, ethers and esters. Further suitable solvents could also include highly polar solvents such as acetonitrile, DMSO (dimethyl sulfoxide) and DMF (dimethylformamide).

Preferably water, low molecular weight alcohols, i. e. ethanol and methanol, industrial methylated spirits, methyl ethyl ketone or mixtures thereof are used, The most preferred solvents are water ($\epsilon$=80) and methanol and methyl ethyl ketone.

The solvent selected must have a boiling point lower than that of the continuous phase to allow its removal and it is also important to consider any azeotropes which may form restricting removal of the discontinuous phase solvent.

Solvents which are particularly suitable for these 2 emulsion phases are a perfluoro(tributylamine) as continuous phase and water, ethanol, methanol, methyl ethyl ketone and/or industrial methylated spirits, preferably water, methyl ethyl ketone and/or methanol as discontinuous phase.

A further essential component of the present process is a surfactant, generally having a hydrophilic head group and a hydrophobic tail. Preferable examples are those with a hydrophilic-lipophilic balance HLB (as described in "Introduction to Surface and Colloid Chemistry" (Ed. D J Shaw, Pub. Butterworth Heinemann)) less than 10. HLB of a surfactant is a measure of the degree to which the surfactant is hydrophilic or lipophilic, determined by calculating values for the different regions of the molecule. The head group may be a salt to allow charging or can also consist of an amine or acid moiety which can also, but does not have to, charge the particle.

The role of the surfactant is to stabilize the reverse emulsion when it is formed and then to stabilize the solid particles after solvent removal. The surfactant can also be used to charge the particles, allowing them to switch electrophoretically. This may be achieved by using a blend of surfactants or one single surfactant. Preferably the surfactant is used in 1-10% by weight based on the total reverse emulsion.

Preferably, fluorinated surfactants are used in combination with the non-polar fluorinated solvents used in the variants of the invention comprising steps a) and a'). Such are known to experts in the field and include (but are not limited to) the Disperbyk® series by BYK-Chemie GmbH, Solsperse® and Solplus® range from Lubrizol, RM and PFE range from Miteni, EFKA range from BASF, Fomblin® Z, and Fluorolink® series from Solvay Solexis, Novec® series from 3M, Krytox® and Capstone® series available from DuPont.

Preferred are poly(hexafluoropropylene oxide) polymeric surfactants with a monofunctional carboxylic acid end group, further preferred are poly(hexafluoropropylene oxide) polymeric surfactants with a monofunctional carboxylic acid end group and a weight-average molecular weight Mw between 1000 and 10000, most preferred between 3000 and 8000 and especially preferred between 5000 and 8000. Most preferred is Krytox® 157 FSH.

Krytox® 157 FS is a functionalized version of the DuPont series of Krytox® fluorinated oils that acts as a surfactant. The functionality is a carboxylic acid group located on the terminal fluoromethylene group of poly(hexafluoropropylene oxide). Krytox® 157 FS is available in three relatively broad molecular weight ranges designated as low (L), medium (M), and high (H) with the following typical properties. Krytox® 157 FS is insoluble in most common organic solvents. Further suitable Krytox® surfactants comprise the following end groups: methyl ester, methylene alcohol, primary iodide, allyl ether or a benzene group. Preferable surfactant additive in this work is Krytox® 157 FSH.

The new dispersions comprising non-polar fluorinated solvents are prepared by use of a polymer. In step a) carbon black is incorporated into an organic polymer to yield a black polymer particle. Many polymer types may be used. Preferably, the polymer is produced from a monomer which is insoluble in non-polar fluorinated solvents or the monomer is soluble but the polymer is insoluble in non-polar fluorinated solvents.

Suitable and commercially available polymers are:
Poly(2-acrylamido-2-methyl-1-propanesulfonic acid), Poly(2-acrylamido-2-methyl-1-propanesulfonic acid-co-acrylonitrile) acrylonitrile, Poly(N-isopropylacrylamide), Poly(acrylamide-co-acrylic acid), Poly(acrylamide-co-acrylic acid) partial sodium salt, Poly(acrylamide-co-acrylic acid) potassium salt, Polyacrylamide, Poly(acrylic acid sodium salt), Poly(acrylic acid), Poly(methacrylic acid), Poly(acrylic acid) partial potassium salt, Poly(acrylic acid) partial sodium salt, Poly(acrylic acid), partial sodium salt-graft-poly(ethylene oxide), Poly(acrylic acid-co-maleic acid) sodium salt, Poly(ethylene-alt-maleic anhydride), Poly(isobutylene-co-maleic acid) sodium salt, Poly(methyl vinyl ether-alt-maleic acid monobutyl ester), Poly(methyl vinyl ether-alt-maleic acid), Poly(methyl vinyl ether-alt-maleic anhydride), Poly(styrene-alt-maleic acid), Poly(1-vinylpyrrolidone-co-2-dimethylaminoethyl methacrylate), Poly(2-dimethylamino)ethyl methacrylate) methyl chloride quaternary salt, Poly(2-ethylacrylic acid), Poly(2-hydroxyethyl methacrylate), Poly(2-hydroxypropyl methacrylate), Poly(2-propylacrylic acid), Poly(methacrylic acid, sodium salt), Poly[(2-ethyldimethylammonioethyl methacrylate ethyl sulfate)-co-(1-vinylpyrrolidone)], Poly[ethyl acrylate-co-methacrylic acid-co-3-(1-isocyanato-1-methylethyl)-α-methylstyrene], adduct with ethoxylated nonylphenol, Cucurbit[5]uril, Cucurbit[7]uril, Cucurbit[8]uril, Ethylenimine, oligomer, Poly(2-ethyl-2-oxazoline), Poly(2-isopropenyl-2-oxazoline-co-methyl methacrylate), Poly(acrylamide-co-diallyldimethylammonium chloride), Poly(allylamine hydrochloride), Poly(allylamine), Poly(diallyldimethylammonium chloride), Poly(dimethylamine-co-epichlorohydrin-co-ethylenediamine), Poly(ethyleneimine), Poly[bis (2-chloroethyl) ether-alt-1,3-bis [3-(dimethylamino)propyl]urea] quaternised, Polyethylenimine, 80% ethoxylated, Polyethylenimine, branched, 2-Dode-cenylsuccinic polyglyceride, Glycerol propoxylate average, Poly(methyl vinyl ether), Polyepoxysuccinic acid, Poly(4-styrenesulfonic acid) ammonium salt, Poly(4-styrenesulfonic acid) lithium salt, Poly(4-styrenesulfonic acid), Poly(4-styrenesulfonic acid-co-maleic acid) sodium salt, Poly(anetholesul-fonic acid, sodium salt), Poly(sodium 4-styrenesulfonate), Poly(vinyl pyrrolidone), Poly(vinyl acetate-co-crotonic acid), Poly(vinyl sulfate) potassium salt, Poly(vinylphosphonic acid), Poly(vinyisulfonic acid, sodium salt), Mowiol, Poly(vinyl alcohol), Poly(vinyl alcohol-co-ethylene).

Polymers which are particularly suitable are those which are highly hydrophilic or are charged to render themselves hydrophilic. Especially preferred are for example poly(vinyl pyrrolidone), poly(acrylamide), poly(acrylic acid), and poly (methacrylic acid). Most preferred are poly(vinyl pyrrolidone) and poly(acrylic acid), especially poly(vinyl pyrrolidone).

Advantageously, a combination of the following compounds is used in the present process: carbon black, poly (vinyl pyrrolidone), methanol, perfluoro(tributylamine), and a poly(hexafluoropropylene oxide) polymeric surfactant with a monofunctional carboxylic acid end group and a weight-average molecular weight Mw between 5000 and 8000. Optionally a blue or black dye may be added, optionally in combination with a light stabiliser. Also, a combination of the following compounds is used in the present process: carbon black, poly(acrylic acid), methanol, perfluoro(tributylamine), and a poly(hexafluoropropylene oxide) polymeric surfactant with a monofunctional carboxylic acid end group and a weight-average molecular weight Mw between 5000 and 8000. Optionally a blue or black dye may be added, optionally in combination with a light stabiliser.

The present coloured polymer particles comprise preferably 10-75%, especially 15-65%, by weight of carbon black based on the combined weights of polymer, surfactant and carbon black.

The present coloured polymer particles are preferably spherical particles with a size (diameter) in the range of 50-2000 nm and preferably with a monodisperse size distribution. Preferred particle sizes are 80-1900 nm, preferably 90-1500 nm, Particle sizes are determined by photon correlation spectroscopy by a common apparatus such as a Malvern NanoZS particle analyser. Larger agglomerates that eventually form during the reaction can be removed post reaction. Methods include filtering, centrifuging, sieving. Typically a 5 micron filter cloth is used. Centrifuging can also be employed to remove smaller unwanted polymer particles that may be formed during the reaction.

The present process comprises the steps of a) forming a reverse emulsion comprising at least one polymer, at least one carbon black pigment, at least one polar solvent, at least one non-polar fluorinated solvent, and at least one surfactant, b) removing the polar solvent or polar solvents by evaporative methods.

The reverse emulsion of step a) is prepared preferably by a1) forming a polar phase by mixing at least one carbon black pigment, at least one polymer, and at least one polar solvent, a2) forming a non-polar phase by mixing at least one non-polar fluorinated solvent and at least one surfactant, a3) combining the polar phase and the non-polar phase, and a4) homogenising the combined phases to form the reverse emulsion.

Optionally a blue or black dye, optionally in combination with a light stabiliser, may be added to carbon black in step a) or a1).

An additional step c) can be conducted for concentrating or removing the non-polar fluorinated solvent or non-polar fluorinated solvents. Preferably, a stirred filtration cell can be used. It is especially advantageous that step c) can be omitted if the continuous phase consists of the solvent intended for use in the electrophoretic solvent. However, the present invention can also provide the black polymer particles directly. If requested, purification of the black polymer particles according to the invention is possible by methods familiar to the person skilled in the art, such as filtration, centrifuging, and sieving.

Preferably, the process of the invention consists of steps a), and step b), and optionally step c). Advantageously, a process consisting of steps a1), a2), a3), a4), step b), and step c) for concentrating provides a dispersion directly suitable for electrophoretic fluids.

The reverse emulsion is preferably formed using some form of shear. This shear may be in the form of high shear homogenisation by for example a Silverson homogeniser or sonication by for example a Branson Sonifier. It is often advantageous to form a reverse pre-emulsion using low shear and then higher shear to form the desired particle size. The shear is preferably applied once the non-polar continuous phase and polar discontinuous phase have been formed, separately mixed until homogeneous and then combined to form a 2-phase system. Additionally, shear may be advantageous to form the polar phase which can be done using high shear homogenisation or sonication.

Advantageously, the present process can be easily scaled up.

The present invention also relates to dispersions, especially EPD fluids, comprising a non-polar fluorinated solvent and black particles, wherein the particles comprise carbon black, a polymer, and a surfactant. Preferably, the black particles consist of carbon black, a polymer, and a surfactant. Optionally, the dispersions may be coloured, i.e. by adding a dyed which is soluble in the fluorinated solvent.

In particular, the invention concerns dispersions, especially EPD fluids, comprising a non-polar fluorinated solvent and black particles, wherein the particles comprise carbon black, a polymer, preferably poly(vinyl pyrrolidone) or poly(acrylic acid), and a fluorinated surfactant. Preferably, the black particles consist of carbon black, a polymer, preferably poly(vinyl pyrrolidone) or poly(acrylic acid), and a fluorinated surfactant. Especially preferred non-polar fluorinated solvents and fluorinated surfactants and combinations thereof are described in the foregoing.

Preferred compounds and compound combinations of the variants given above are provided by use of the preferred compounds as described in the foregoing related to the preferred processes according to the invention.

Particles and dispersions of the invention are primarily designed for use in electrophoretic applications, especially for use in mono, bi or polychromal electrophoretic devices. A typical electrophoretic display comprises an electrophoretic fluid comprising the particles dispersed in a low polar or non-polar solvent along with additives to improve electrophoretic properties, such as stability and charge. Examples of such electrophoretic fluids are well described in the literature, for example U.S. Pat. No. 7,247,379; WO 99/10767; US 2007/0128352; U.S. Pat. Nos. 7,236,290; 7,170,670; 7,038,655; 7,277,218; 7,226,550; 7,110,162; 6,956,690; 7,052,766; 6,194,488; 5,783,614; 5,403,518; 5,380,362.

The particles of the invention may be used in combination with a dyed fluid and/or with additional particles such as oppositely or equally charged particles of different colour.

Any other additives to improve the electrophoretic properties can be incorporated provided they are soluble in the formulation medium, in particular thickening agents or polymer additives designed to minimise settling effects.

In case another dispersion solvent than the non-polar fluorinated solvents used in step a) shall be used in addition or separately for particles of the invention, it can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Adjustment of these variables can be useful in order to change the behaviour of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle I solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The solvents and additives used to disperse the particles are not limited to those used within the examples of this invention and many other solvents and/or dispersants can also be used to disperse particles made according to the invention. Lists of suitable solvents and dispersants for electrophoretic displays can be found in existing literature, in particular WO 99/10767 and WO 2005/017046. The electrophoretic fluid is then incorporated into an electrophoretic display element by a variety of pixel architectures, such as can be found in C. M. Lampert, Displays; 2004, 25(5) published by Elsevier B.V., Amsterdam.

The electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The dispersions and the black polymer particles according to the present invention are suitable for all known electrophoretic media and electrophoretic displays, e.g. flexible displays, TIR-EPD (total internal reflection electrophoretic devices), one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage, shelf edge labels, etc.

Particles and dispersions of the invention may also be used in optical, electrooptical, electronic, electrochemical, electrophotographic, electrowetting, electro-osmosis, and electrohydrodynamic displays and/or devices, e.g. TIR (total internal reflection electronic devices), and in security, cosmetic, decorative, signage, and diagnostic applications. The use in electrowetting displays is preferred. Electrowetting (EW) is a physical process where the wetting properties of a liquid droplet are modified by the presence of an electric field. This effect can be used to manipulate the position of a coloured fluid within a pixel. For example, a nonpolar (hydrophobic) solvent containing colourant can be mixed with a clear colourless polar solvent (hydrophilic), and when the resultant biphasic mixture is placed on a suitable electrowetting surface, for example a highly hydrophobic dielectric layer, an optical effect can be achieved. When the sample is at rest, the coloured non-polar phase will wet the hydrophobic surface, and spread across the pixel. To the observer, the pixel would appear coloured. When a voltage is applied, the hydrophobicity of the surface alters, and the surface interactions between the polar phase and the dielectric layer are no longer unfavourable. The polar phase wets the surface, and the coloured non-polar phase is thus driven to a contracted state, for example in one corner of the pixel. To the observer, the pixel would now appear transparent. A typical electrowetting display device consists of the particles in a low polar or non-polar solvent along with additives to improve properties, such as stability and charge. Examples of such electrowetting fluids are described in the literature, for example in WO 2011/017446, WO 2010/104606, and WO 2011/075720.

The disclosures in the cited references are thus expressly also part of the disclosure content of the present application. Unless the context clearly indicates otherwise, plural forms of the terms used herein are to be construed as including the singular form and vice versa. All of the features of the invention disclosed may be used in any combination, unless clearly indicates otherwise. Particularly, the preferred features of the invention may be used in any combination. Further variants of the invention and combinations of features, especially preferred features are disclosed in and/or derive from the claims and the examples. The following examples explain the present invention in greater detail without restricting the scope of protection.

EXAMPLES

FC-43 and Novec® 7500 are purchased from Acota Ltd, UK. Krytox® 157 FS(H) (weight-average molecular weight Mw 7000-7500) is purchased from GBR Technologies, UK. Methanol is purchased from VWR. Polyvinyl pyrrolidone (PVP; weight-average average molecular weight Mw=29 000) and polyacrylic acid (PAA, weight-average average molecular weight Mw 100,000), Solvent Blue 35 are purchased from Sigma-Aldrich, UK. Carbon Black FW200 or XPB229 is obtained from Orion Engineered Carbons. Solvent Black 27 is obtained from BASF.

The characterisation of the formulations was performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications. The colour coordinates of this dispersion are measured using an X-rite Color i5 spectrophotometer in a 50 micron thickness glass cell in transmissive mode unless stated otherwise and formulated at 3 wt % dispersion of particles with 0.5 wt % Krytox®, Example 1

Preparation of Carbon Black PVP Particles

Krytox® 157-FS(H) (1.8 g) is dissolved in FC-43 (30 ml) to make the oil phase.

Separately, methanol (10 ml), FW200 (0.5 g) and PVP (3.6 g) are combined and stirred until homogeneous and homogenised by high shear mixing for 5 minutes (whilst being cooled in an ice bath).

The two phases are then combined and mixed by shear mixer.

The dispersion is then sonicated for 5 minutes at 40% strength on the Branson Sonifer to form an emulsion (whilst being cooled in an ice bath). The emulsion is added into a 500 ml florentine flask and methanol is removed on a rotary evaporator where the temperature of the bath is 60° C. and the pressure is set to 300 mbar. Pressure is reduced in 50 mbar steps to 50 mbar pressure and left there for 1 hour to ensure complete removal of solvents.

Reaction mixture is filtered through 50 micron cloth. Solids content is 11.4 weight %, particle size is 211 nm.

Zp: +6.4 (3% particles, 0.5% Krytox® 157-FS(H) in FC-43) Mobility: 0.03 ×$10^{-10}$ m$^2$/Vs L* 33, Y 7.53, x 0.41, y 0.39

Example 2

Preparation of Carbon Black PVP Particles

Krytox® 157-FS(H) (10.8 g) is dissolved in FC-43 (120 ml) to make the oil phase.

Separately, methanol (60 ml), carbon black FW200 (3.0 g) and PUP (21.6 g) are combined and stirred until homogeneous using a high shear mixer for 10 minutes whilst being cooled in an ice bath.

The two phases are then combined and mixed by shear mixer for 10 minutes whilst being cooled in an ice bath.

The dispersion is then sonicated for 5 minutes at 40% strength on the Branson Sonifer to form an emulsion (whilst being cooled in an ice bath).

The emulsion is added into a 500 ml florentine flask and methanol is removed on a rotary evaporator where the temperature of the bath is 60° C. and the pressure is set to 300 mbar. Pressure is reduced in 50 mbar' steps to 50 mbar pressure and left there for 1 hour. The flask is raised out of the water bath and left at 50 mbar for a further 1 hour to ensure complete removal of solvents.

Reaction mixture is filtered through 50 micron cloth into an amber bottle.

Solids: 13.4%

Yield: 88%

The product mixture is concentrated using a stirred filtration using the 100 nm membrane and is filtered at 10 psi for 18 hrs.

Solids: 22.8%

The concentrated mixture is then refiltered to increase the solid content under the same conditions as before.

Solids: 27.6%

Size: 243 nm

Zp: +40.2 (3% particles, 0.5% Krytox® 157-FS(H) in FC-43) Mobility: 0.009 ×$10^{-10}$ m$^2$/Vs Example 3

Preparation of Carbon Black PVP Particles with Solvent Exchange

Krytox® 157-FS(H) (10.8 g) is dissolved in FC-43 (120 ml) to make the oil phase and submitted to high shear mixing for 10 minutes.

Separately, methanol (60 ml), carbon black FW200 (3.0 g) and PVP (21.6 g) are combined and stirred until homogeneous using high shear mixing for 10 minutes (whilst being cooled in an ice bath).

The two phases are then combined and mixed by shear mixer for 10 minutes.

The dispersion is then sonicated for 5 minutes at 40% strength on the Branson Sonifer to form an emulsion (whilst being cooled in an ice bath). The emulsion is added into a 500 ml florentine flask and methanol is removed on a rotary evaporator where the temperature of the bath is 60° C. and the pressure is set to 300 mbar. Pressure is reduced in 50 mbar steps to 50 mbar pressure and left there for 1 hour to ensure complete removal of solvents.

Reaction mixture is filtered through 50 micron cloth into an amber bottle.

Solids: 13.4%
Yield: 85%

The product mixture is then submitted to stirred filtration using a 100 nm membrane and is filtered at 10 psi for 2 days.

Solids: 33.6%
mass product: 15.98 g (31.53 g FC-43)
47.29 g of Novec® 7500 is added at this stage The concentrated mixture is then refiltered to increase the solid content under the same conditions as before.

Solids: 41.5%
Zp: +93.7 (3% particles, 0.5% Krytox® 157-FS(H) in FC-43) Mobility: 0.02 ×10$^{-10}$ m$^2$/Vs
Size: 282 nm Example 4

Preparation of Carbon Black PAA Particles

Krytox® 157-FS(H) (0.8 g) is dissolved in FC-43 (30 ml) to make the oil phase.

Separately, methanol (10 ml), XPB229 (0.35 g) and PAA (1.6 g) are combined and stirred until homogeneous and high shear mixed for 5 minutes whilst being cooled in an ice bath.

The two phases are then combined and mixed by a Turrax high shear mixer whilst being cooled in an ice bath.

The dispersion is sonicated for 5 minutes at 40% strength on the Branson Sonifer to form an emulsion whilst being cooled in an ice bath.

The emulsion is added into a 500 ml florentine flask and methanol is removed on a rotary evaporator where the temperature of the bath is 60° C. and the pressure is set to 300 mbar. Pressure is reduced in 50 mbar steps to 50 mbar pressure and left there for 1 hour to ensure complete removal of solvents.

Reaction mixture is filtered through 50 micron cloth.
Size: 382 nm,
Zp: +23.7 (3% particles, 0.5% Krytox® 157-FS(H) in FC-43) Mobility: 0.005 ×10$^{-10}$ m$^2$ Vs.

Example 5

Prepartion of Particles of Carbon Black and PAA with Additional Blue Dye

Krytox® 157-FS(H) (1.8 g) is dissolved in FC-43 (30 ml) to make the oil phase.

Separately, methanol (10 ml), XPB229 (0.5 g), Solvent Blue 35 (0.1 g) and FAA (3.6 g) are combined and stirred until homogeneous and high shear mixed for 5 minutes whilst being cooled in an ice bath.

The two phases are then combined and mixed by a Turrax high shear mixer whilst being cooled in an ice bath.

The solution is then sonicated for 5 minutes at 40% strength on the Branson Sonifer to form an emulsion whilst being cooled in an ice bath.

The emulsion is added into a 500 ml florentine flask methanol is removed on a rotary evaporator where the temperature of the bath is 60° C. and the pressure is set to 300 mbar. Pressure is reduced in 50 mbar steps to 50 mbar pressure and left there for 1 hour to ensure complete removal of solvents.

Reaction mixture is filtered through 50 micron cloth.
Size: 356 nm, L* 5.41, Y 0.5999, x 0.47, y 0.42

Example 6

Preparation of Particles of Carbon Black and PVP with added Black Dye

Krytox® 157-FS(H) (0.72 g) is dissolved in FC-43 (20 ml) to make the oil phase.

Separately, methanol (10 ml), FW200 (0.4 g), Solvent Black 27 (0.1 g) and PVP (3.6 g) are combined and stirred until homogeneous and subjected to high shear mixing for 5 minutes whilst being cooled in an ice bath.

The two phases are combined and high shear mixed whilst being cooled in an ice bath.

The solution is sonicated for 5 minutes at 40% strength on the Branson Sonifer to form an emulsion whilst being cooled in an ice bath.

The emulsion is added to a 500 ml florentine flask and methanol is removed on a rotary evaporator where the temperature of the bath is 60° C. and the pressure is set to 300 mbar. Pressure is reduced in 50 mbar steps to 50 mbar pressure and left there for 1 hour to ensure complete removal of solvents.

Reaction mixture is filtered through 50 micron, Size: 252 nm
Yield: 78%
L* 12.23, Y 1.44, x 0.44, y 0.40

The invention claimed is:

1. A process for the preparation of black polymer particles dispersed in at least one non-polar fluorinated solvent for use in electrophoretic devices, the process comprising the steps of
    a) forming a reverse emulsion comprising at least one polymer selected from poly(vinyl pyrrolidone) or poly(acrylic acid), at least one carbon black pigment, at least one polar solvent, at least one non-polar fluorinated solvent, at least one fluorinated surfactant, and a blue and/or black dye, wherein the reverse emulsion comprises perfluoro(tributlyamine) as a non-polar phase, and
    b) removing the polar solvent or solvents by evaporative methods, wherein the non-polar, fluorinated solvent or solvents are not removed.

2. The process according to claim 1, wherein the reverse emulsion of step a) is prepared by a process comprising; a1) forming a polar phase by mixing at least one polymer, at least one carbon black pigment, and at least one polar solvent, a2) forming a non-polar phase by mixing at least one non-polar, fluorinated solvent, and at least one surfactant, a3) combining the polar phase and the non-polar phase, and a4) homogenizing the combined phases to form the reverse emulsion.

3. The process according to claim 1, wherein the polymer of step a) is insoluble in the non-polar fluorinated solvent, and the polymer is produced from at least one monomer that is insoluble in the non-polar fluorinated solvent, or from at least one monomer that is soluble in the non-polar fluorinated solvent.

4. The process according to claim 1, wherein the non-polar fluorinated solvent used in step a) is a perfluorinated hydrocarbon having a refractive index of ≤1.3, a dielectric constant ≤10, and a boiling point ≥80° C., and has a refractive index and a density similar to that of the polymer used in step a).

5. The process according to claim 1, wherein the polar solvent used in step a) is selected from water, low molecular weight alcohols, methyl ethyl ketone, acetonitrile, DMSO, DMF or mixtures thereof.

6. The process according to claim 1, wherein a polar phase comprises one or more of water, ethanol, methanol, methyl ethyl ketone, or industrial methylated spirits.

7. The process according to claim 1, further comprising step c) concentrating the non-polar fluorinated solvent or solvents.

8. The process according to claim 1, further comprising step c') removing the non-polar fluorinated solvent or solvents.

9. A dispersion comprising black particles prepared according to claim 8.

10. A mono, bi or polychromal electrophoretic device comprising the dispersion according to claim 9.

11. A Total Internal Reflection (TIR) device comprising the dispersion according to claim 9.

12. An electrophoretic display device comprising the dispersion according to claim 9.

13. A dispersion prepared by a process according to claim 1.

14. The process according to claim 1, wherein the blue and/or black dye is selected from the group consisting of Solvent Blue 35, Solvent Black 27, Solvent Black 29, Solvent Black 34, Acid Black 52, Acid Black 107, Acid Black 132, Acid Black 172, Acid Black 194, Acid Black 211, Acid Black 222, Direct Black 19, Direct Black 22, Direct Black 51, Direct Black 80, and Direct Black 112.

15. The process according to claim 1, wherein the blue and/or black dye comprises a stabilizer selected from the group consisting of 1,2,2,6,6-pentamethylpiperidine, 1,2,2,6,6-pentamethyl-4-piperidinol, and bis(1,2,2,6,6-pentamethyl-4-piperidinyl)-[(3,5-bis(1,1-di methyl)-4-hydroxyphenyl]methylbutylmalonate.

16. A dispersion comprising a non-polar, fluorinated solvent, and black particles, wherein the black particles comprise carbon black, a polymer selected from poly(vinyl pyrrolidone) or poly(acrylic acid), a fluorinated surfactant, and a blue and/or black dye, and wherein the dispersion comprises perfluoro(tributylamine) as a non-polar phase.

17. The dispersion according to claim 16, comprising perfluoro(tributylamine), and the black particles consist of the carbon black, poly(vinyl pyrrolidone) and/or poly(acrylic acid), and a poly(hexafluoropropylene oxide) polymeric surfactant with a monofunctional carboxylic acid end group, and a weight-average molecular weight Mw between 5000 and 8000.

18. An electronic device comprising a dispersion of claim 16, wherein the electronic device is selected from the group consisting of an electrooptical device, electrochemical device, electrophotographic device, electrowetting device, electro-osmotic device, electrohydrodynamic device, and electrophoretic device.

19. The device according to claim 18, the device selected from the group consisting of a dynamic keypad, e-paper watch, dynamic pricing and advertising device, e-reader, rollable display, smart card media, product packaging, mobile phone, lab top, display card, digital signage and shelf edge label.

20. The device according to claim 18, wherein the dispersion is applied to the device by a technique selected from inkjet printing, slot die spraying, nozzle spraying, and flexographic printing.

* * * * *